(12) United States Patent
Munro

(10) Patent No.: US 7,431,373 B2
(45) Date of Patent: Oct. 7, 2008

(54) DISPLAY DEVICES

(75) Inventor: Alistair Hunter Munro, Glasgow (GB)

(73) Assignee: John McGavigan Limited, Glasgow (GB)

( * ) Notice: Subject to any disclaimer, the term of this patent is extended or adjusted under 35 U.S.C. 154(b) by 81 days.

(21) Appl. No.: 10/523,056

(22) PCT Filed: Jul. 30, 2003

(86) PCT No.: PCT/GB03/03315

§ 371 (c)(1),
(2), (4) Date: Jan. 9, 2006

(87) PCT Pub. No.: WO2004/012955

PCT Pub. Date: Feb. 12, 2004

(65) Prior Publication Data

US 2006/0208521 A1 Sep. 21, 2006

(30) Foreign Application Priority Data

Aug. 3, 2002 (GB) .................................. 0218088.3
Jun. 16, 2003 (GB) .................................. 0313793.2

(51) Int. Cl.
*B62D 25/14* (2006.01)
(52) U.S. Cl. ....................................................... 296/70
(58) Field of Classification Search ................. 296/70; 180/90
See application file for complete search history.

(56) References Cited

U.S. PATENT DOCUMENTS

| 4,572,856 | A | * | 2/1986 | Gembinski ................... 428/71 |
| 5,108,530 | A |   | 4/1992 | Niebling, Jr. et al. |
| 5,514,317 | A |   | 5/1996 | Rosica et al. |
| 5,702,078 | A |   | 12/1997 | Shaw |
| 6,267,072 | B1 |  | 7/2001 | Seto et al. |
| 6,447,131 | B1 | * | 9/2002 | Thompson et al. ............ 362/26 |
| 2007/0248795 | A1 | * | 10/2007 | Hansen et al. ............... 428/187 |

FOREIGN PATENT DOCUMENTS

| EP | 0 676 307 A1 | 10/1995 |
| GB | 0 498 095 | 1/1939 |
| GB | 0 527 718 | 10/1940 |
| GB | 1 026 887 | 4/1966 |
| GB | 1 424 337 | 2/1976 |
| GB | 2 201 387 A | 9/1988 |
| GB | 2 220 282 A | 1/1990 |
| GB | 2 281 529 A | 3/1995 |

* cited by examiner

*Primary Examiner*—H Gutman
(74) *Attorney, Agent, or Firm*—Tarolli, Sundheim, Covell & Tummino LLP

(57) ABSTRACT

There is disclosed an improved sheet form member or appliqué (10) which finds particular use as an automotive vehicle display panel or instrument panel. The sheet form member (10) comprises at least one, and preferably two, upstanding portions or rims (12) integrally formed thereon, the/each portion (12) having a height of at least 4 mm from a surface of the sheet form member (10). The/each portion (12) has an ink coating applied to a surface thereof, a pigment of an ink of the ink coating being dissolved in an high temperature resin base.

43 Claims, 7 Drawing Sheets

SUBSTRATE

PRINTING OF FIRST & SECOND SURFACE

HARDCOAT

FORMING PROCESS

FORMED SHEET

DISPLAY DEVICES

FIELD OF INVENTION

The present invention relates to an improved sheet form member or "appliqué" for use, for example, as a display panel, decorative panel or moulding. More particularly, though not exclusively, the present invention relates to a sheet form member or appliqué having at least one integrally formed upstanding portion or "rim", for example, for use in a facia, instrument or instrumentation panel, or dial of a vehicle such as an automotive vehicle.

BACKGROUND TO INVENTION

Planar appliqués are used for displaying information and for providing added aesthetic appeal to facias or instrument panels of automotive vehicles. For example, such appliqués are used as speedometers, rev. counters or the like.

A feature that has been added to instrument panels, e.g. for reasons of aesthetic appeal, are chrome or mirror like rings, which form a rim that surrounds an instrumentation gauge. Typically such rims are provided for the speedometer and engine speed or rev. counter gauges.

A known method of creating such instrument panels having rims is to mount a separately formed rim or rims on a substantially planar appliqué. Individually moulded rims are mounted to the appliqué by means of ultrasonic welding or heat welding. The appliqué is typically a flat polycarbonate sheet which may have printing thereon. Each of the individually moulded rims is typically formed from an ABS (acrylonitrile butadiene styrene) plastic, which is in turn exposed to a vacuum metalisation process in order to give each rim a chrome or mirror like effect.

The process of vacuum metalisation has the disadvantages of having a high fall out rate, as well being environmentally unfriendly. In addition, the process of mounting the rims to the appliqué has the disadvantage of requiring additional manufacturing steps and time—which ultimately leads to higher production costs. Particularly, careful alignment of the appliqué and rims is required.

Prior art known from searches carried out on the two GB applications from which the present case claims priority comprises:

| | |
|---|---|
| GB 2 220 282 A | (WINWARD), |
| GB 2 201 387 A | (YAZAKI), |
| GB 1 424 337 | (UNION CARBIDE), |
| GB 1 026 887 | (LUCAS), |
| GB 0 527 718 | (LUCAS), |
| GB 0 498 095 | (AUTO UNION), |
| EP 0 676 307 A | (MAGNETTI MARELLI), |
| GB 2 281 529 A | (KAUMAGRAPH), and |
| US 6 267 072 B1 | (SETO) |

The content of these prior art documents are incorporated herein by reference.

It is an object of at least one embodiment of at least one aspect of the present invention to obviate or at least mitigate one or more of the aforementioned problems in the prior art.

It is also an object of at least one embodiment of at least one aspect of the present invention to provide an appliqué comprising a flat tile having at least one and preferably two integral upstanding bezel rings, the tile being made of a plastics material.

It is also an object of at least one embodiment of at least one aspect of the present invention to provide an appliqué comprising a flat tile having at least one, and preferably two, bezel ring(s) being convex when viewed from an obverse surface of the appliqué and concave when viewed from a reverse surface of the appliqué.

SUMMARY OF INVENTION

One or more of the above objects may be addressed by the general solution of providing a sheet form member or appliqué, e.g. for use as a vehicle display panel, decorative panel or instrument panel or cluster, with at least one and advantageously two integral ring portions.

Advantageously the vehicle may be an automotive vehicle, e.g. a car or automobile, off-road vehicle, utility vehicle, truck, van, lorry, motorcycle, moped, scooter, or the like.

Alternatively the vehicle may be an aeroplane, train, boat or the like.

According to a first aspect of the present invention there is provided a sheet form member or appliqué having at least one portion integrally formed thereon, said at least one portion having a height of at least 4 mm from a surface of the sheet form member.

Provision of a sheet form member having an upstanding portion integrally formed thereon eliminates the need to have individually formed rims affixed to the sheet form member, thereby reducing the number of manufacturing assembly steps required and the associated costs involved therewith.

The sheet form member may be adapted for use as a display panel or decorative panel, for example, for an instrumentation panel of a vehicle such as an automotive vehicle.

Preferably, the height of the portion formed is between about 4 mm and 9 mm.

Preferably the portion height may be between about 4 mm and 7.5 mm.

In one embodiment the portion height may be around 6.5 mm, and in another embodiment around 7.5 mm.

The portion may be upstanding from a front surface of the sheet form member, and may be continuous, that is to say, form a closed shape. In such case the portion may be termed a "rim" or "ring".

The closed shape may be substantially circular, oval, elliptical or the like or a segmented circle, oval or ellipse. The shapes may be selected from those generally used for display gauges of a facia or instrument panel of a vehicle such as an automotive vehicle.

Preferably the portion comprises a first wall, a second wall, and a top part and preferably has an open base part.

Preferably the base part of the portion has a width from an outer-most side of the second wall to an inner-most side of the first wall in the region of 5 mm to 9 mm.

The portion may project from a substantially planar surface of the sheet form member.

Preferably the portion circumscribes an area of said planar surface.

Preferably the first wall is convex in shape when viewed from a front of the sheet form member. The first wall of said portion may comprise part of a circle having a radius of between about 10 mm and 20 mm.

Preferably the second wall of said portion may be substantially vertical.

The second wall may be inclined at a shallow angle to the top part of the portion.

Preferably the top part is angled. The first wall may be higher than the second wall and the top portion may comprise part of a circle having a radius of about 0.5 mm.

In a preferred embodiment there are provided two rims extending from the front surface of the sheet form member. One rim may be provided for a speedometer gauge, whilst the other rim may be provided for an engine speed (rev) counter or a clock.

The sheet form member may be provided with a pressure sensitive adhesive coated on a second or rear surface, e.g. to aid with mounting of the sheet form member onto a backing part. Alternatively, the sheet form member may be mountable to a backing part by way of clip fittings.

Preferably a spacing between outer-most side walls of each of the two rims is about 45 mm to 50 mm.

Preferably a planar portion of the sheet form member has a thickness of between 0.25 mm and 0.5 mm.

Preferably the appliqué is made substantially from a plastics material, e.g. polycarbonate. Alternatively the sheet form member may be made from a blend of polycarbonate and poly-butylene-terraphthalate (PBT) or from ABS.

The sheet form member may be printed with a substantially single colour of ink, e.g. black.

However, the at least one rim may be differently coloured to a rest of the sheet form member. For example, the at least one rim may be silver or chrome coloured, and may be provided with an aluminium resin coating, e.g. on an inner surface thereof.

The sheet form member may be provided with a printed design. The printed design, e.g. dial chaplets, may be created by printing on a first and/or a second surface of the sheet form member.

The sheet form member may be a laminate, that is to say, may comprise two or more layers laminated together.

According to a second aspect of the present invention there is provided a component for an automotive vehicle comprising a sheet form member according to the first aspect of the present invention.

The component may comprise an instrument or gauge assembly.

Preferably the component further comprises a rigid backing part having the sheet form member mounted thereto. Alternatively, the sheet form member may be moulded to the backing part. Alternatively again, the sheet form member may be glued or otherwise fixed to the backing part.

Preferably the backing part may be made from a plastics material, e.g. polycarbonate or ABS.

The sheet form member may be provided with a pressure sensitive adhesive coated on a second or rear surface to aid with mounting of the sheet form member onto the backing part. Alternatively, the sheet form member may be mounted to the backing part by way of clip fittings.

According to a third aspect of the present invention there is provided an automotive vehicle including a sheet form member according to the first aspect of the present invention or a component according to the second aspect of the present invention.

According to a fourth aspect of the present invention there is provided a method of forming a sheet form member according to the first aspect of the present invention, the method comprising the steps of:

providing a substantially planar sheet; and forming said at least one portion on said substantially planar sheet.

The at least one portion may be formed by a forming process such as "pressure forming". Pressure forming is a process typically including heating the sheet form member, which may be a planar sheet, such that the sheet is able to take the form of a mould to which the sheet is applied. Pressure forming can use a fluid pressure, e.g. air or gas, to force the substrate into the mould by pushing or sucking via increased or reduced pressure on one side of the sheet such that the sheet takes the shape of the mould.

Alternatively the at least one portion may be formed by a forming process such as "match metal forming". Match metal forming is a process of shaping a sheet by use of two moulds between which a normally heated sheet member is placed. One of the moulds is used to force the sheet into the other mould such that the sheet may take a desired form. It has been found that the process of match metal forming has an advantage of being beneficial in reducing the problem of wrinkles being formed on the substantially planar sheet in the vicinity around the at least one portion.

In yet another alternative, the at least one portion may be formed by a forming process such as "cold forming". Cold forming is a process of shaping a sheet into a desired form by forcing a sheet material into a required shape by the use of a die, punch, mould or the like without the use of heat.

The substantially planar sheet may be made substantially from a plastics material, e.g. polycarbonate or a mixture or blend thereof.

The substantially planar sheet may be a laminate. That is to say the substantially planar sheet may be made of a number of sheets layered and bonded or adhered together.

The substantially planar sheet may have printing on first and second sides thereof.

Preferably the method includes the step of applying to at least one area of a second surface of the substantially planar sheet an ink, e.g. a chrome or silver coloured ink, e.g. an aluminium based ink resin, the at least one area then being formed into the at least one portion.

According to a fifth aspect of the present invention there is provided a sheet form member or appliqué having an ink coating applied to at least one portion of a surface, e.g. an obverse surface, thereof, a pigment of an ink of said ink coating being dissolved in a high temperature resin base.

Herein by "high temperature" is meant that the resin has a softening temperature in the region of about 160° C. and above, e.g. 200° C. and above.

In one embodiment a high temperature resin base having a softening temperature of about 205° C. may be used.

The use of a high temperature resin based ink may provide an added advantage of producing a sheet form member that can be manipulated by a forming process to produce a raised portion coincident with the ink coating. This is believed to be due to the elastic and high temperature resistant properties of such resin based inks. The ink coating may have distinct well defined edges prior to and subsequent to forming the raised portion.

Preferably the resin base for the coating is a dissolved plastics material. The plastics material may be a polycarbonate material.

Most preferably the plastics material is a copolycarbonate based on a combination of bisphenol A (4,4'-isopropylidenediphenol) and bisphenol TMC (trimethylenecylohexane bisphenol).

Alternatively, and advantageously, the resin base is acrylic cellulose acetate butyrate.

Preferably the plastics material is dissolved in a non-halogenated solvent such as tolvene, tetrahydrofurane, ethyl acetate or butanone.

Providing a resin based ink, e.g. copolycarbonate, that is soluble in non-halogenated solvents provides added ecological advantages when it comes to preparation of solutions or coatings and, more especially, the processing and application of these solutions or coatings.

Preferably the resin based ink contains a metal pigment, e.g. chrome and/or aluminium pigment.

Preferably the metal pigment comprises particles or flakes having an average size in the range of 5 microns to 55 microns or 2 mm to 4 mm in diameter or length.

The ink coating may form a closed shape, and the closed shape may be annular, oval or elliptical or the like, or segmented annular, oval, elliptical, or the like.

Preferably the ink coating has a width of between about 4 mm to 8 mm between an inside and outside of said closed shape.

Preferably the sheet form member has a thickness of between 0.25 mm and 0.5 mm.

Preferably the sheet form member is substantially made from polycarbonate. Alternatively the appliqué is made from a blend of polycarbonate and poly-butylene-terraphthalate (PBT).

The sheet form member may be provided with a printed design. The printed design may be printed on first and/or second surfaces of the sheet form member.

The sheet form member may be provided with at least one portion integrally formed thereon, said at least one portion having a raised height of at least 4 mm from an obverse surface of said sheet form member.

Preferably the sheet form member has at least two portions formed thereon, at least one and preferably all of said portions having a raised height of at least 4 mm from the obverse surface of said sheet form member.

Preferably said ink coating is substantially coincident with said at least one portion.

According to a sixth aspect of the present invention there is provided a sheet form member or appliqué having an ink coating applied to at least a portion of a surface, e.g. an obverse surface, thereof, a pigment of an ink of said ink coating being dissolved in an acrylic cellulose acetate butyrate resin base.

Providing a resin based acrylic that is soluble in non-halogenated solvents provides added ecological advantages when it comes to preparation of solutions or coatings and, more especially, the processing and application of these solutions or coatings.

Preferably the pigment comprises particles or flakes having an average size in the range 5 to 55 microns in diameter or length.

According to a seventh aspect of the present invention there is provided a component for an automotive vehicle including a sheet form member according to either of the fifth or sixth aspects of the present invention.

Preferably the component further comprises a rigid backing part having the sheet form member moulded thereto. Alternatively, the sheet form member may be glued or otherwise adhered or fixed to the backing part.

Preferably the rigid backing part may be made from a plastics material, e.g. polycarbonate or ABS.

According to an eighth aspect of the present invention there is provided an automotive vehicle including a sheet form member according to either of the fifth or sixth aspects of the present invention or a component according to the seventh aspect of the present invention.

According to a ninth aspect of the present invention there is provided a method of providing a sheet form member according to either of the fifth or sixth aspects of the present invention, the method comprising the steps of:

providing a substantially planar sheet; and
applying an ink coating thereto.

The ink coating may be applied by screen printing, pad printing, or similar technique.

The substantially planar sheet may be made of a substantially plastics material, e.g. polycarbonate or a blend thereof.

The substantially planar sheet may be printed on first and/or second sides thereof.

The method may include the step of producing a laminated sheet form member by laminating a further substantially planar sheet form member, e.g. of polycarbonate, to an obverse surface or reverse side of said sheet form member.

The method may further include the step of forming at least one portion integrally on the sheet form member, said at least one portion preferably having a raised height of at least 4 mm from the obverse surface of said sheet form member.

Preferably the at least one portion is substantially coincident with at least part of said ink coating.

Preferably the at least one portion is formed by a forming process such as match metal forming, high pressure forming or cold forming.

According to a further aspect of the present invention there is provided a device, apparatus or method according to any of the appended claims.

BRIEF DESCRIPTION OF DRAWINGS

Embodiments of the present invention will now be described by way of example only, and with reference to the accompanying diagrams, which are.

DETAILED DESCRIPTION OF DRAWINGS

Figure 1:
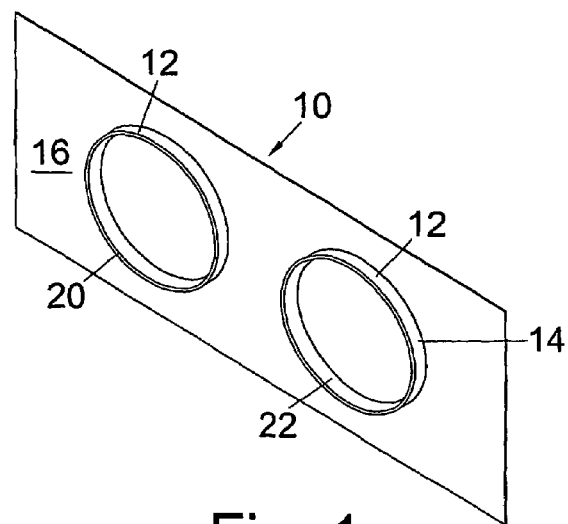
FIG. 1 a perspective view from the front and to one side of a sheet form member in accordance with a first embodiment of the present invention.

Referring initially to FIG. 1, there is illustrated a sheet form member or "appliqué", generally designated by reference numeral 10, according to a first embodiment of the present invention.

The sheet form member 10 has two upstanding portions or rims 12 integrally formed thereon, each upstanding portion 12 having a height 14 which is greater than 4 mm, and, in this embodiment, around 6.5 mm, or alternatively 7.5 mm, above a front or obverse surface 16 of the sheet form member 10.

In this embodiment, each of the upstanding portions 12 are continuous, forming a circular closed shape ring on the front surface 16 of the sheet form member 10, for use as a decorative panel, for example, for an instrument panel of a vehicle, such as particularly an automotive vehicle. The raised portions 12 can alternatively be of any other shape generally used for a surround that outlines display gauges of vehicles such as automotive vehicles.

Figure 2:
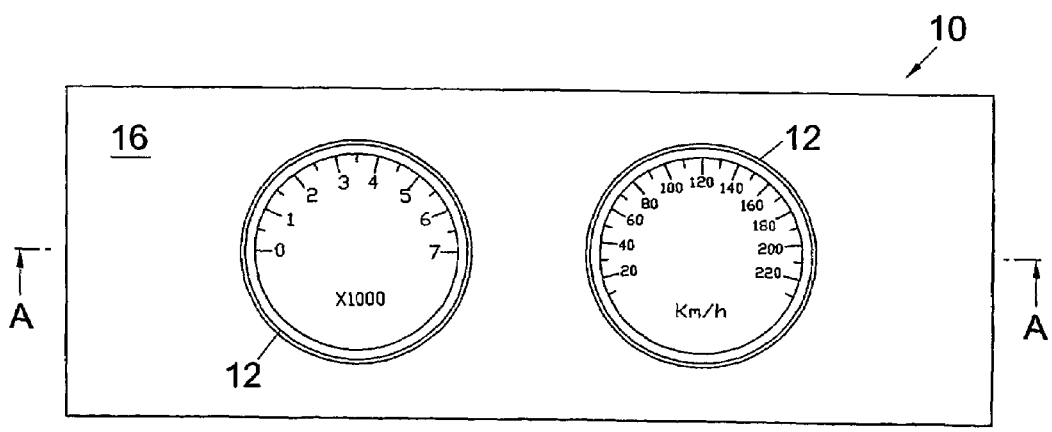
FIG. 2 a plan view of the sheet form member of FIG. 1.
Figure 3:
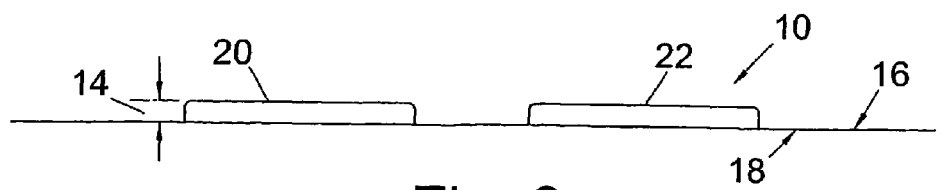
FIG. 3 a side view of the sheet form member of FIG. 1.

Referring now to FIGS. 2 and 3, the sheet form member 10 has printing on the front surface 16 and/or a reverse surface 18. The printing in this instance corresponding to data relating to an engine speed (rev) counter and speedometer of the vehicle.

The sheet form member 10 is made of a polycarbonate plastics material which is about 0.375 mm thick. The sheet form member 10 is, therefore, pliable such that it may take the shape of a surface which is not completely flat and to which the sheet form member 10 is affixed in use.

Figure 6:
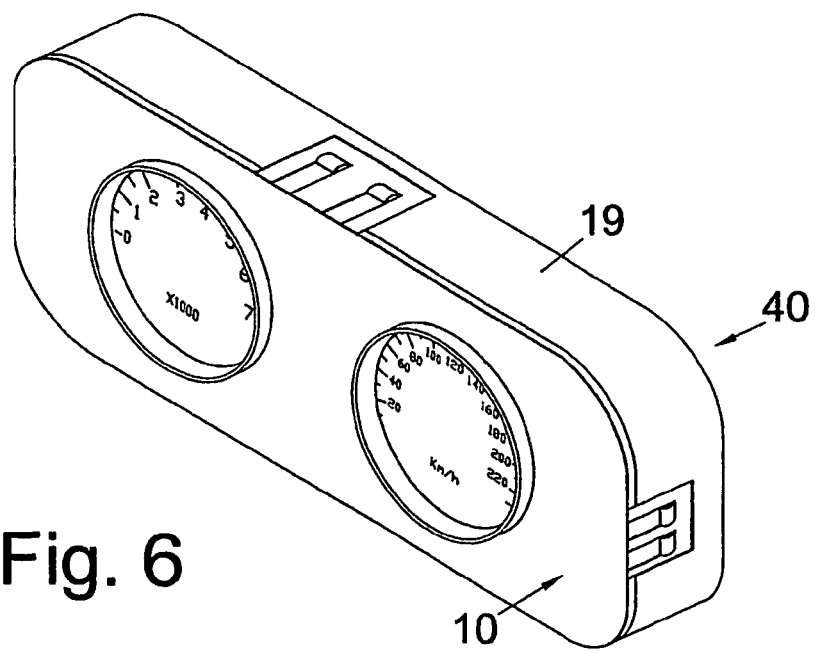
FIG. 6 a perspective view from the front and to one side of a component part including the sheet form member of FIG. 1 in accordance with the present invention.

Referring to FIG. 6, a reverse surface 18 of the sheet form member 10 can be coated with a pressure sensitive adhesive in order that the sheet form member 10 can be attached to a backing part 19 so as to form a component 40 that is used to provide a facia or instrument panel of a vehicle, such as an automotive vehicle, as shown in FIG. 6.

Rings 20, 22 formed by the upstanding portions 12 are spaced apart such that outer walls of each of the two rings 20, 22 are about 45 mm apart.

In addition, first and second (outer and inner/obverse and reverse) surfaces 16, 18 of the sheet form member 10 form a substantially flat planar surface, respective portions of which planar surfaces 16,18 are surrounded by the rings 20, 22 which typically have a radius of about 4.5 mm to 55 mm, e.g. 51 mm. In this embodiment each ring 20,22 has a total diameter of 102.07 mm, and centre points of the rings 20,22 are spaced by 151.81 mm. A thickness of each annular ring 20,22 is around 6.81 mm and a distance between adjacent rings 20,22 is 48.74 mm.

Figure 4:
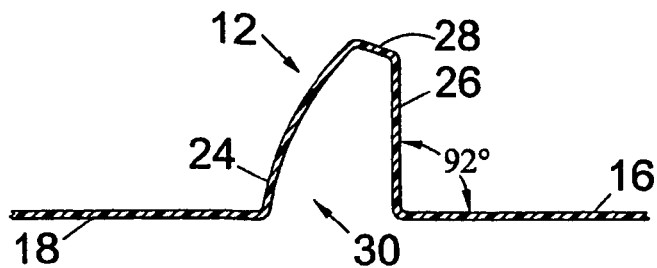
FIG. 4 an enlarged cross-sectional side view of a portion of the sheet form member of FIG. 1.
Figure 5:
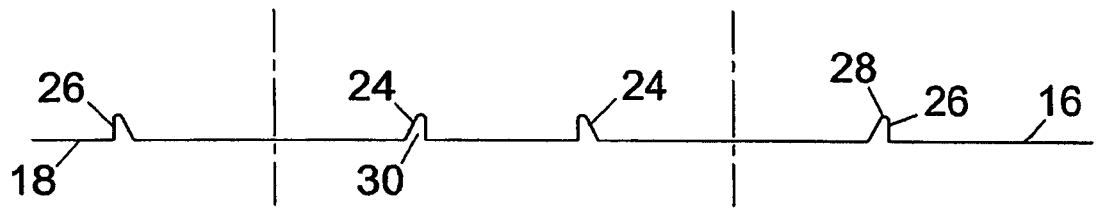
FIG. 5 a cross-sectional side view along line A-A of the sheet form member of FIG. 2.

Referring now to FIG. 4, there is shown detail of the raised or upstanding portion 12. It can be seen that the upstanding portion 12 comprises a first wall 24, a second wall 26, a top part 28 and has an open (concave) base 30. In this embodiment the base 30 has a width from an inner-most side of the first wall 24 to an outer-most side of the second wall 26 of typically 6.5 mm to 7.00 mm, e.g. 6.8 mm.

In addition, the first wall 25 is convex in shape when viewed from a front of the sheet form member 10, the first wall 24 having a radius of about 10 mm to 15 mm, e.g. 13 mm or 13.07 mm.

The second wall 26 of the upstanding portion 12 is substantially vertical having only a shallow incline to the top part 28, creating an angle of about 92° between the outer surface 16 of the sheet form member 12 and the second wall 26. The top part 28 is also angled relative to the outer surface 16, the first wall 24 being slightly higher than the second wall 26. In addition, the top portion 28 has a radius of typically 0.4 mm to 0.6 mm, e.g. 0.5 mm.

Referring again to FIG. 6, there is shown a component part 40 for a vehicle, particularly an automotive vehicle according to the present invention. The component part 40 comprises a sheet form member 10 mounted to a rigid backing piece 19 having lugs which engage with a casing 19. The sheet form member 10 can be disposed on the rigid backing piece, e.g. by clips, or by adhesive or can be "in-moulded" therewith, i.e. moulded thereto.

Figure 7:
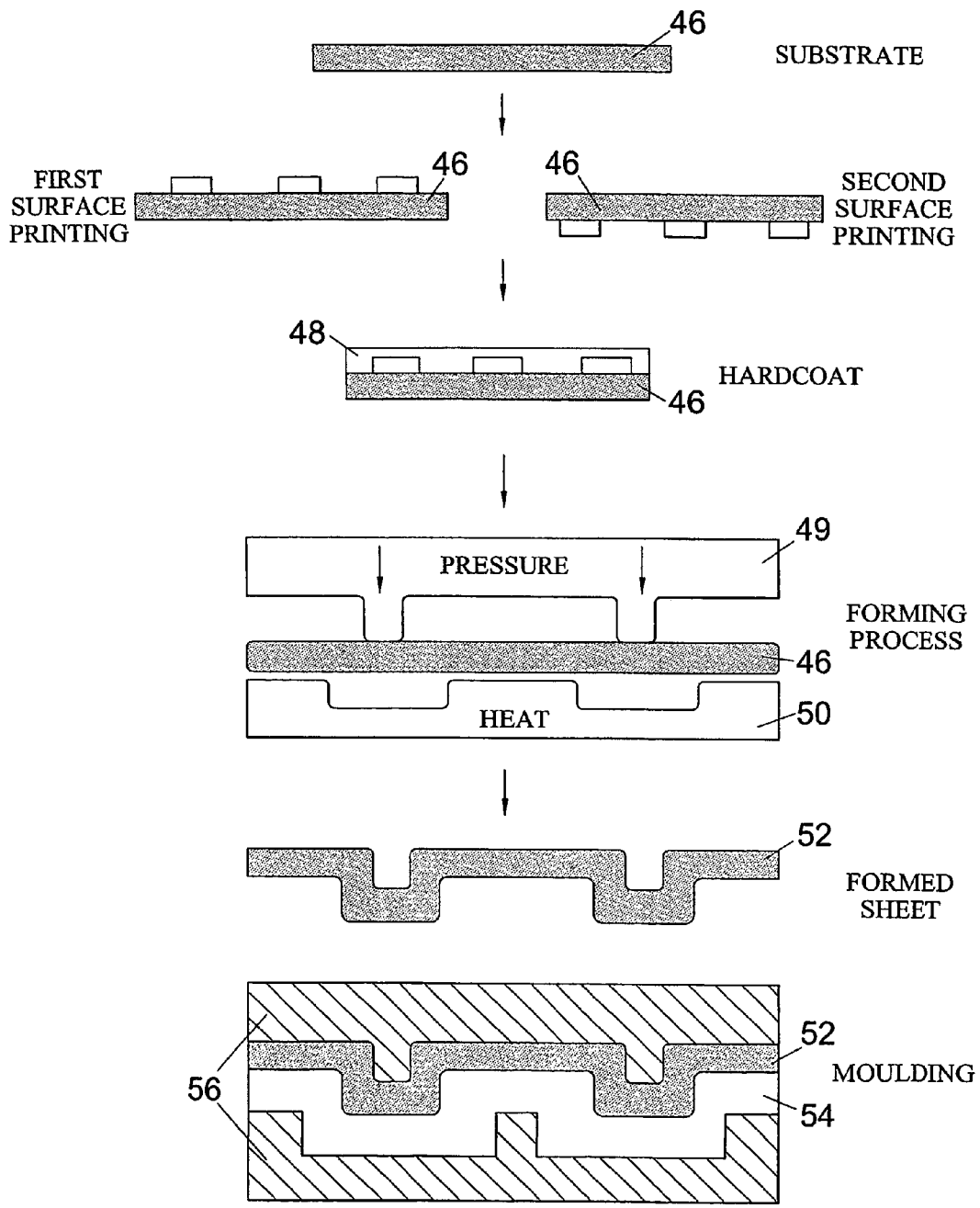
FIG. 7 schematic illustrations of steps involved in a first process of producing the formed sheet form member of FIG. 1 in accordance with the present invention.

Referring next to FIG. 7, there is illustrated a first process or method of forming the sheet form member 10 of FIG. 1. The steps involved in this first process of forming the sheet form member 10 are to provide a substantially planar sheet 10 which can be a polycarbonate substrate 46. A design is then applied to the substrate 46 by printing on first and/or second surfaces thereof, i.e. front surface 16 and reverse surface 18 employing an ink coating. A next step can then involve applying a hard or protective coat layer 48 to protect the ink coating design laid down on the substrate 46.

When the substrate 46 is ready to be shaped, that is to say have upstanding portions 47 (12) made in the substrate 46. The substrate 46 is exposed to a match metal forming process which involves heating the substrate 46 and shaping or forming the substrate 46 by use of two dies 49, 50 between which the substrate 46 is sandwiched. Alternatively a high pressure forming process or cold forming process can be used. The resultant shaped substrate or formed appliqué 52 can then be moulded or to a backing piece or component part 54 to which is conformed to the design and shape of the formed appliqué is required, by use of a moulding tool 56. Alternatively, the appliqué 52 can be mounted or affixed, e.g. by adhesive to the backing piece 54.

In one implementation the raised portions 12 are coated with an ink having a chrome aluminium pigment giving the raised portions 12 a mirror type finish.

The height of the upstanding portions 12 can typically be between 4 mm and 9 mm. The base 30 can be between 5 to 9 mm, and the radius of the first wall 24 can be between 10 mm to 20 mm.

Figure 8:
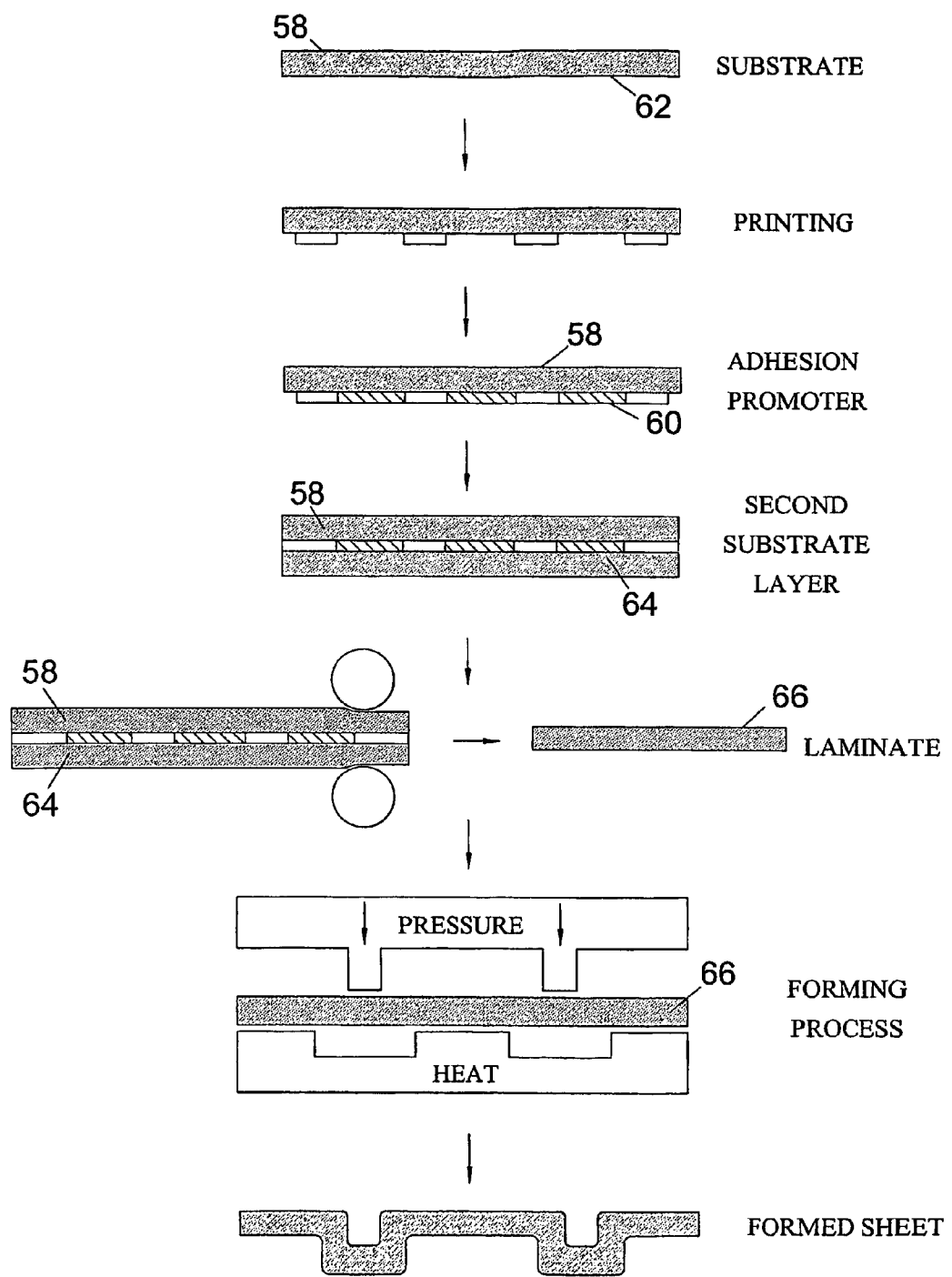
FIG. 8 schematic illustrations showing steps involved in a second process of producing the formed sheet form member of FIG. 1 in accordance with the present invention.

In an alternative implementation, the substrate 46 from which the sheet form member 10, is made can be a laminate and formed from a process such as that shown in FIG. 8. After an ink coating has been applied or printed to the relevant surfaces of a first substrate layer 58, an adhesion promoter 60 is applied to a reverse surface 62 of the substrate 58 and a second substrate layer 64 is applied to the reverse surface of the first substrate layer 58 to create a laminate 66. The laminate 66 is then passed through heated pressure rollers and the resultant laminated sheet 66 is exposed to a match metal forming, high pressure forming or cold forming process so as to create the required shape of appliqué.

Providing a sheet form member 10 having upstanding portions 12 integrally formed thereon eliminates the need to create individually formed rims and then affix the rims to the sheet form member, thereby reducing the number of manufacturing assembly steps and the associated costs involved therewith. In addition, the process of match metal forming has been found to provide the added advantage of alleviating or reducing the problem of wrinkles being formed on the planar sheet in the vicinity around the first and/or second walls 24,26 of the upstanding portion 12.

Figure 9A:
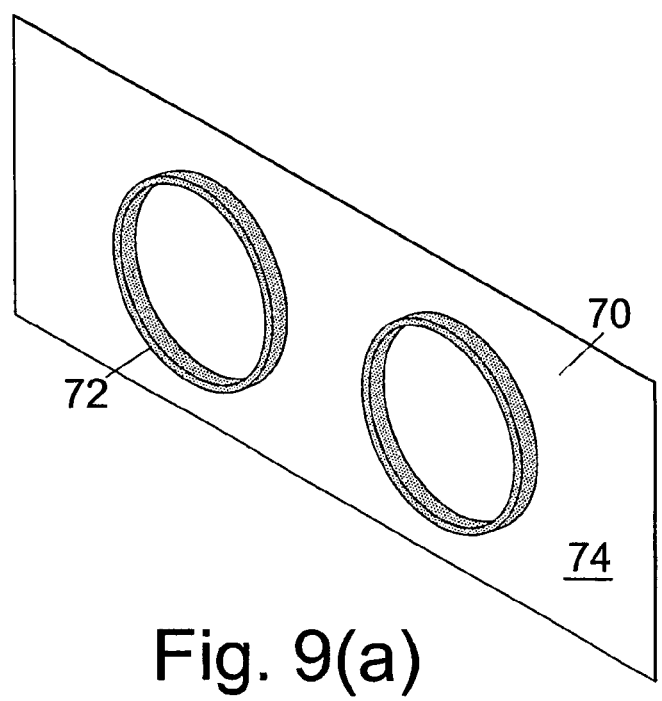
FIGS. 9(*a*), 9(*b*) a perspective view from the front and to one side, and a side view respectively, of a sheet form member in accordance with the present invention prior to forming.
Figure 9B:

Referring next to FIGS. 9(a) and (b) there is shown a sheet 70 for use in forming the sheet form member 10 of FIG. 1, but prior to forming of the portions 12. The member 70 has an ink coating 72 applied to a front or obverse surface 74 thereof. The ink coating 72 is a high temperature resin based ink which is plastics based, and typically copolycarbonate based, the copolycarbonate comprising a combination of bisphenol A and a bisphenol, e.g. bisphenol TMC. In an alternative and advantageous implementation the resin base is acrylic cellulose acetate butyrate.

The ratio of the bisphenol components determines the properties of heat resistance, or glass transition temperature which increase with the bisphenol TMC content. In addition, as the bisphenol TMC content of the copolycarbonate increases so does its solubility in non-halogenated solvents, due to the more pronounced aliphatic nature of the copolycarbonate.

The ink coating 72 is, therefore, made from a copolycarbonate material dissolved in a non-halogenated solvent having a chrome aluminium pigment added thereto.

The ink coating 72 is applied to the sheet form member 70 such that it creates an annular design closed shape having a width of typically 8 mm.

The sheet form member 70 can also have a design applied by first and/or second surface printing.

In one embodiment the sheet form member 70, which has the ink coating 72 applied to it, can be subjected, e.g. to a match metal or other forming process, as described hereinabove, in order to create upstanding portions that are coincident with the ink coating 72. That is to say, the sheet form member 70 has chrome like rims integrally formed thereon.

The application of an ink coating 72 of a high temperature resin based ink to a planar sheet form member 70 provides the added advantage of producing a sheet form member 70 that can be manipulated by a forming process, such as match metal or other forming, to produce raised portions coincident with the ink coating, due to the elastic and high temperature resistance of such resin based inks.

Figure 10:
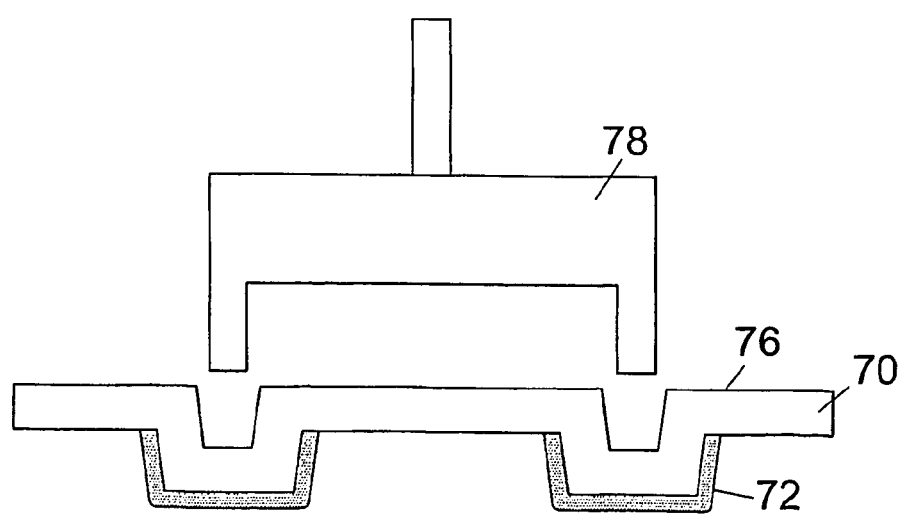
FIG. 10 a schematic illustration of a process of applying an ink coating to a reverse side of a formed sheet form member in accordance with the present invention.

To increase the opacity of the mirror like rims, after the sheet form member 70 has been subjected to the match metal forming, high pressure or cold forming process, it can be required to apply an additional coat of ink to a reverse side 76 of the formed sheet form member 70. This additional coat of ink can be applied either by a tampo or a pad printing process as shown in FIG. 10 or alternatively by masking or spraying. The printing process involves the use of a suitable shaped applicator 78, which in this embodiment would be annular and made of a material such as silicon rubber, in order to apply the additional coat of paint. The additional coat of ink can be the same ink as used on the obverse surface 74 of the sheet form member 70. Alternatively, the additional coat of ink can be a black or white ink used to increase the opacity of the chrome like rims when viewed from the obverse side.

It will be appreciated that various modifications may be made to the foregoing without departing from the scope of the invention. For example, the sheet form member may be laminated as described hereinabove.

Figure 11:
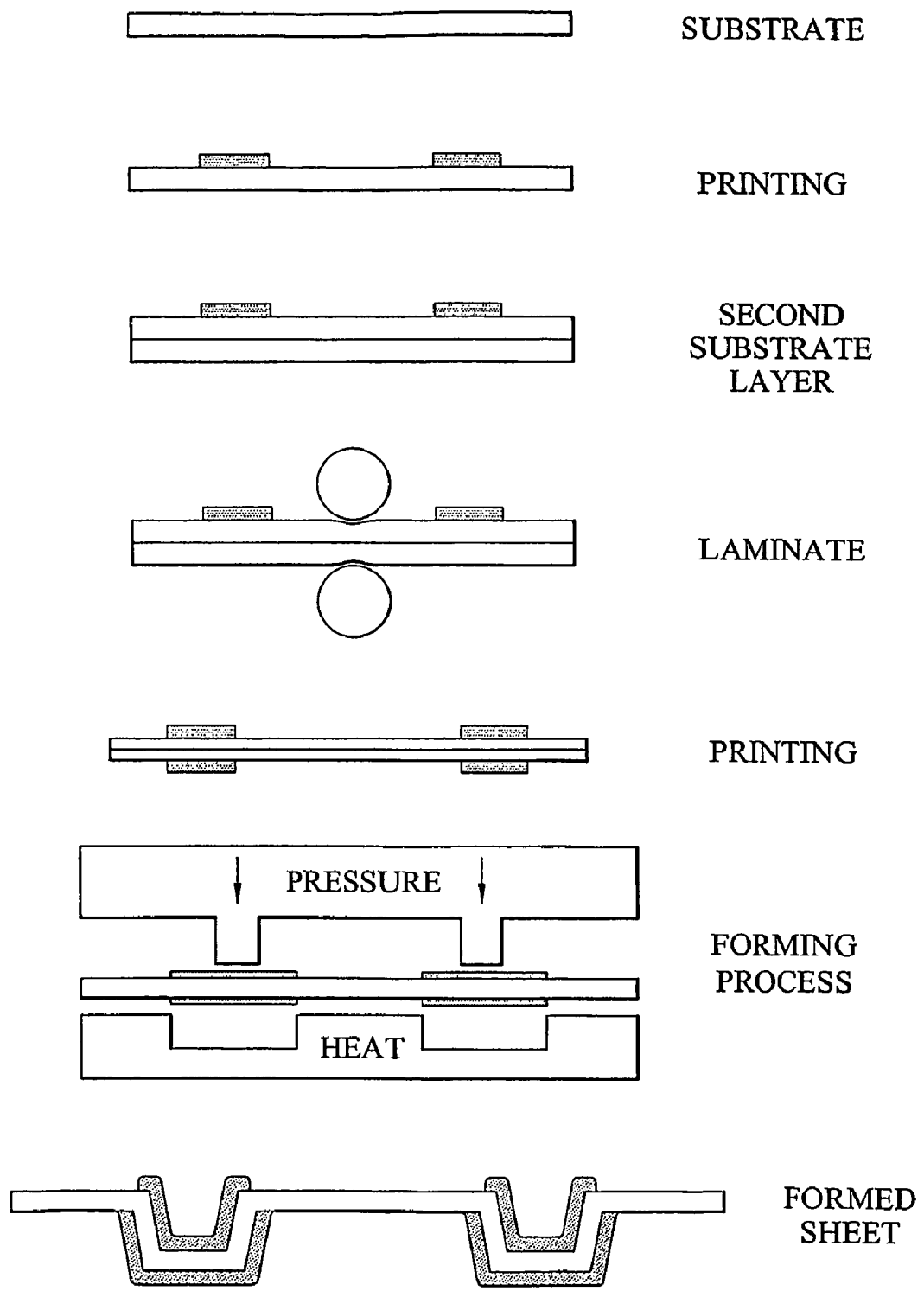
FIG. 11 schematic illustrations showing steps involved in a third process of providing the formed sheet form member of FIG. 1 in accordance with the present invention having printing on an obverse side and a reverse side of a raised portion.

In addition, the step of applying the additional coat of ink can be applied on the reverse side of the laminated sheet before the match forming process is performed as shown in forming process of FIG. 11. The additional coat of ink is typically an opaque ink that mirrors the printing of the ink coating 72 on the obverse surface 74.

Figure 12:
FIG. 12 a schematic illustration showing steps involved in a fourth process of producing the formed sheet form member of FIG. 1 in accordance with the present invention.
Figure 12:
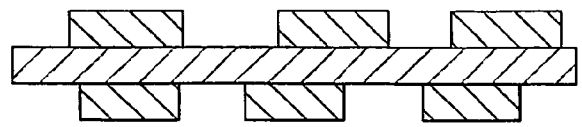
Figure 12:
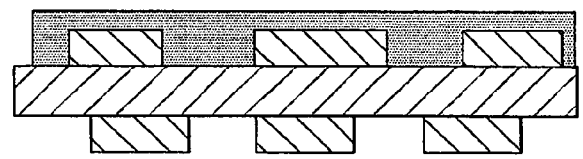
Figure 12:
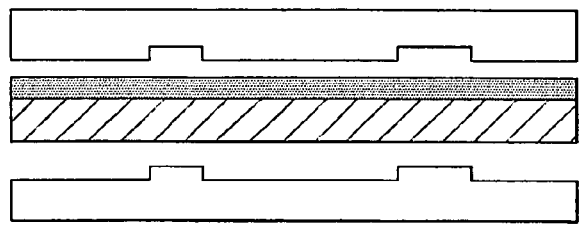
Figure 12:

Further other modifications may include forming the portion by way of a cold forming process as illustrated in FIG. 12, or the use of an acrylic cellulose acetate butyrate resin based ink as the ink coating, as mentioned above.

Finally, it will be appreciated that the disclosed embodiments of the present invention provide a solution to the particular difficulty of forming at least one, and particularly two or more raised ring portions integrally on an appliqué without causing wrinkling of a planar surface of the appliqué.

The invention claimed is:

1. An appliqué adapted for use in an instrument, instrument cluster or instrument panel of an automotive vehicle, the appliqué comprising a sheet form member having an obverse side and a reverse side and comprising a plastics material, the sheet form member comprising:

at least one substantially planar portion having an obverse area on the obverse side and a reverse area on the reverse side;

at least one rim portion or ring portion integrally formed with the respective at least one substantially planar portion, the at least one rim portion forming a closed shape with encloses the respective at least one substantially planar portion;

a further substantially planar portion having a further obverse area on the obverse side and a further reverse area on the reverse side, the further substantially planar portion being integrally formed with the respective at least one rim portion, the further substantially planar portion surrounding the respective at least one rim portion;

the at least one rim portion protruding from the respective obverse area and from the further obverse area by a height of at least 4 mm, and the at least one rim portion being recessed from the respective reverse area and further reverse area, and wherein the at least one rim portion is of a first colour and the respective substantially planar portion is of a second colour different to the first colour.

2. An appliqué as claimed in claim 1, wherein the further substantially planar portion is of the second colour different to the first colour.

3. An appliqué as claimed in claim 2, wherein the at least one substantially planar portion and the further substantially planar portion have a thickness of between 0.25 mm and 0.5 mm.

4. An appliqué as claimed in claim 1, wherein the first colour is silver or chrome and the second colour is black.

5. An appliqué as claimed in claim 1, wherein the at least one rim portion comprises a plurality of rim portions, at least one of said rim portions having a height of at least 4 mm from the respective obverse area and a further obverse area common to each of the plurality of rim portions.

6. An appliqué as claimed in claim 1, wherein the at least one rim portion comprises two rim portions, each having a height of at least 4 mm from the obverse side, the two portions being located side by side.

7. An appliqué as claimed in claim 1, wherein an ink coating is applied to a surface of the at least one rim portion, a pigment of an ink of the ink coating being dissolved in a high temperature resin base.

8. An appliqué as claimed in claim 1, wherein the height of the at least one rim portion is between 4 mm and 9 mm.

9. An appliqué as claimed in claim 1, wherein the height of the at least one rim portion is 4 mm to 7.5 mm.

10. An appliqué as claimed in claim 1, wherein the height of the at lest one rim portion is 6.5 mm.

11. An appliqué as claimed in claim 1, wherein the closed shape is selected from one of: substantially circular, oval or elliptical.

12. An appliqué as claimed in claim 1, wherein the at least one substantially planar portion is provided with dial chaplets.

13. An appliqué as claimed in claim 1, wherein the at least rim portion comprises a first wall, a second wall, a top part and an open base part.

14. An appliqué as claimed in claim 13, wherein the base part of the at least one rim portion has a width from an outer-most side of the second wall to an inner-most side of the first wall.

15. An appliqué as claimed in claim 13, wherein the first wall is convex in shape when viewed from the obverse side of the sheet form member.

16. An appliqué as claimed in claim 13, wherein the first wall of the at least one rim portion comprises part of a circle having a radius of 10 mm to 20 mm.

17. An appliqué as claimed in claim 13, wherein the second wall of the at least one rim portion is substantially vertical.

18. An appliqué as claimed in claim 13, wherein the second wall is inclined at a shallow angle to the top part of the respective at least one rim portion.

19. An appliqué as claimed in claim 13, wherein the first wall protrudes more from the obverse side than the second wall does from the obverse side, and the top part comprises part of a circle having a radius of 0.5 mm.

20. An appliqué as claimed in claim 1, wherein the sheet form member is provided with a pressure sensitive adhesive coated on the reverse side.

21. An appliqué as claimed in claim 1, wherein a spacing between outer-most walls of rim portions adjacent one another is 45 mm to 50 mm.

22. An appliqué as claimed in claim 1, wherein the plastics material substantially comprises polycarbonate or acrylonitrite butadiene styrene (ABS).

23. An appliqué as claimed in claim 1, wherein the plastics material comprises a blend of polycarbonate and poly-butylene-terraphthalate (PBT).

24. An appliqué as claimed in claim 1, wherein the sheet form member is provided with a printed design.

25. An appliqué as claimed in claim 1, wherein the printed design is provided by printing on the obverse side and on the reverse side of the sheet form member.

26. An appliqué as claimed in claim 1, wherein the sheet form member is a laminate comprising two or more layers laminated together.

27. An appliqué as claimed in claim 1, wherein an ink coating is provided on the at least one rim portion, such as an obverse surface thereof, a pigment of an ink of the ink coating being dissolved in a high temperature resin base.

28. An appliqué as claimed in claim 27, wherein the high temperature resin base has a softening temperature of above 160° C.

29. An appliqué as claimed in claim 27, wherein the resin base for the ink coating is a dissolved plastics material or acrylic cellulose acetate butyrate.

30. An appliqué as claimed in claim 29, wherein the plastics material is a copolycarbonate which is a combination of bisphenol A (4,4'-isopropylidenediphenol) and bisphenol TMC (trimethylenecylohexane bisphenol).

31. An appliqué as claimed in claim 29, wherein the plastics material is dissolved in a non-halogenated solvent.

32. An appliqué as claimed in claim 27, wherein the high temperature resin based ink contains a chrome pigment, an aluminum pigment, or a mixture of both.

33. An appliqué as claimed in claim 32, wherein the pigment comprises particles or flakes having an average size in the range of 5 microns to 55 microns in diameter or length.

34. An appliqué as claimed in claim 27, wherein the ink coating forms a closed shape, the closed shape optionally being annular, oval or elliptical.

35. An appliqué as claimed in claim 1, wherein an ink coating is provided on the at least one rim portion, such as an obverse surface thereof, a pigment of an ink of the ink coating being dissolved in an acrylic cellulose acetate butyrate resin base.

36. An appliqué as claimed in claim 35, wherein the pigment comprises particles or flakes having an average size in the range of 5 microns to 55 microns in diameter or length.

37. A component for an automotive vehicle comprising an appliqué according to claim 1.

38. A component as claimed in claim 37, wherein the component comprises an instrument, instrument cluster, instrument panel, gauge or control assembly.

39. A component as claimed claim 37, wherein the component further comprises a rigid backing part having the appliqué mounted thereto.

40. A component as claimed in claim 39, wherein the appliqué is molded to the backing part.

41. A component as claimed in claim 39, wherein the appliqué is glued or clipped to the backing part.

42. A component as claimed in claim 39, wherein the backing part is made from a plastics material such as polycarbonate or acrylonitrile butadiene styrene (ABS).

43. An automotive vehicle including an appliqué according to claim 1.

* * * * *